United States Patent

Meyer et al.

[15] 3,671,840

[45] June 20, 1972

[54] METHOD AND APPARATUS FOR ADAPTIVE CONTROL OF A TURNING MACHINE

[72] Inventors: Jurgen Meyer; Gerhard Sautter, both of Erlangen, Germany

[73] Assignee: Siemens Aktiengesellschaft, Berlin and Munich, Germany

[22] Filed: Sept. 23, 1970

[21] Appl. No.: 74,637

[30] Foreign Application Priority Data

Sept. 23, 1969 Germany ..................... P 18 03 742.8

[52] U.S. Cl. .............................................. 318/571, 318/39
[51] Int. Cl. ........................................................... G05b 19/24
[58] Field of Search ............................................ 318/571, 39

[56] References Cited

UNITED STATES PATENTS

| 2,901,927 | 9/1959 | Morgan | 318/39 X |
| 3,190,139 | 6/1965 | Swanson et al. | 318/39 X |
| 3,475,998 | 11/1969 | Steiner et al. | 318/39 X |
| 3,545,310 | 6/1968 | Porath et al. | 318/39 X |

*Primary Examiner*—Benjamin Dobeck
*Attorney*—Curt M. Avery, Arthur E. Wilfond, Herbert L. Lerner and Daniel J. Tick

[57] ABSTRACT

The vibrations of a tool or workpiece are measured during operation to produce vibration signals corresponding to actual vibrations in mutually perpendicular directions. The vibration signals are compared with signals corresponding to datum magnitudes of vibrations in both directions. The work feeding of the tool or workpiece is corrected in accordance with the comparison results.

5 Claims, 7 Drawing Figures

FIG.4a
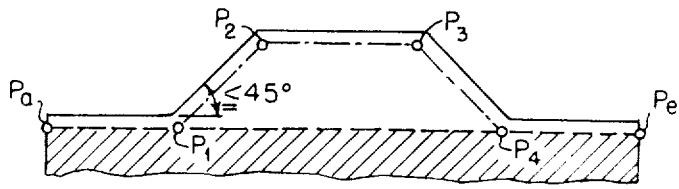
FIG.4b
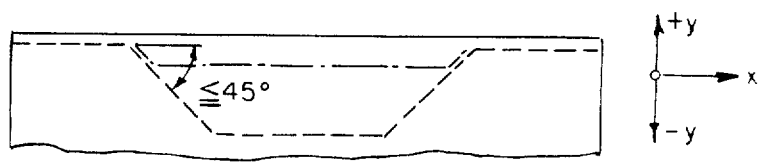
FIG.5a
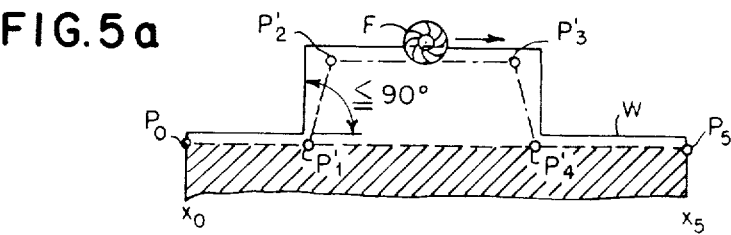
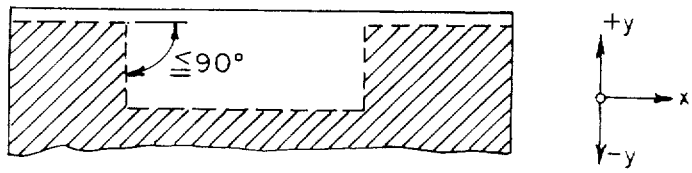
FIG.5b

METHOD AND APPARATUS FOR ADAPTIVE CONTROL OF A TURNING MACHINE

DESCRIPTION OF THE INVENTION

The invention relates to a method and apparatus for adaptive control of a turning machine. More particularly, the invention relates to a method and apparatus for adaptive control of a turning machine such as, for example, a lathe, milling machine, boring machine, or the like.

It is the purpose of adaptive regulation of a machine tool to achieve the maximum feasible material or metal removing rate, under certain conditions, and to simultaneously maintain the programming as simple as possible. In order to achieve this, the speed of the spindle of the turning machine, the work feed of the machine and the cutting depth of the machine may be automatically controlled in dependence upon the forming power or the material removing rate.

The method and apparatus for adaptive control of the present invention are an improvement over the method and apparatus disclosed in copending U.S. Pat. application Ser. No. 866,507, filed Oct. 15, 1969 for "Method and Apparatus For Automatic Forward Feed Programmed Control of a Machine Tool" and assigned to the same assignee and now abandoned. The method and apparatus of the aforedescribed copending patent application function to rapidly feed the tool until it comes into contact with a workpiece. The tool is work fed up to a maximum to the programmed contour after a magnitude depending upon the forming power and the material removing rate exceeds a lower threshold level. The work feeding and movement of the tool is reduced in the direction of reduced feed-in for a period of time until the magnitude depending upon the forming power exceeds an upper threshold level. The tool is work fed repeatedly until the actual contour of the workpiece coincides with a programmed contour.

The magnitude depending upon the forming power may be a torque which is absorbed by the machine tool, workpiece, or the like, or it may be the force which is exerted upon said machine tool.

In turning machines, and other machines of similar type, there is a possibility that the material removing rate feasible for such machines, that is, the material or metal removing datum magnitude or value, cannot be utilized due to vibrations in the tool or in the workpiece.

The principal object of the invention is to provide a new and improved method and apparatus for adaptive control of a turning machine tool.

An object of the invention is to provide a method for adaptive control of a turning machine tool with efficiency, effectiveness and reliability.

An object of the invention is to provide apparatus for adaptive control of a turning machine tool with efficiency, effectiveness and reliability.

An object of the invention is to provide a method and apparatus for compensating for the effect of vibrations of the tool or workpiece.

An object of the invention is to provide a method and apparatus for compensating for rattling resulting from vibrations of the tool or workpiece during operation.

In accordance with the invention, a method for adaptive control of a turning machine tool for removal of material from a workpiece includes the steps of rapidly feeding the tool until it comes into contact with a workpiece, work feeding the tool up to a maximum to the programmed contour after a magnitude depending upon the forming power and the material removing rate exceeds a lower threshold level, reducing the work feeding and movement of the tool in the direction of reduced feed-in for a period of time until the magnitude depending upon the forming power exceeds an upper threshold level, work feeding the tool repeatedly until the actual contour of the workpiece coincides with the programmed contour, deriving the material removing rate $P_z$ from the speed and torque of the tool or workpiece, controlling the feed velocity $V_z$ in one direction of movement of the tool or workpiece in dependence upon the material removing rate and controlling the feed velocity $V_x$ in a direction perpendicular to the one direction in dependence upon the feed velocity $V_z$ and the first derivative $dP_z/dt$. In accordance with the invention, the method comprises the steps of measuring vibrations of the tool or workpiece during operation to produce vibration signals corresponding to actual vibrations in mutually perpendicular directions, comparing the vibration signals with signals corresponding to datum magnitudes of vibrations in the directions to provide comparison results, and correcting the work feeding of the tool or workpiece in accordance with the comparison results.

The method of the invention further comprises comparing the material removing rate derived from the speed and torque of the tool or workpiece with signals corresponding to datum magnitudes of the material removing rate in the directions to provide rate comparison results, and correcting the datum magnitude of the material removing rate in at least one of the directions in accordance with the rate comparison results.

In accordance with the invention, apparatus for adaptive control of a turning machine for removal of material from a workpiece includes a tool holder for the tool. Feeding means rapidly feeds the tool until it comes into contact with a workpiece. Work feeding means work feeds the tool up to a maximum to the programmed contour after a magnitude depending upon the forming power and the material removing rate exceeds a lower threshold level and reduces the work feeding and movement of the tool in the direction of reduced feed-in for a period of time until the magnitude depending upon the forming power exceeds an upper threshold level. The work feeding means operates repeatedly until the actual contour of the workpiece coincides with a programmed contour. The work feeding means is connected to the tool or workpiece, receives signals representing the speed and torque of the tool or workpiece and produces a first control signal for controlling the feed velocity $V_z$ in one direction of movement of the tool or workpiece in dependence upon the material removing rate and produces a second control signal for controlling a feed velocity $V_x$ in a direction perpendicular to the one direction in dependence upon the feed velocity $V_z$ and the first derivative $dP_z/dt$ of the material removing rate $P_z$. In accordance with the invention, the apparatus comprises vibration measuring means mounted on the tool holder for measuring vibrations of the tool during operation to produce vibration signals corresponding to actual vibrations in mutually perpendicular directions. Comparing means connected to the vibration measuring means compares the vibration signals with signals corresponding to datum magnitudes of vibration in the directions to provide comparison results. Feed regulating means for controlling the tool is coupled between the comparing means and the tool for controlling the work feeding of the tool in accordance with the comparison results.

The tool has a spindle and the vibration measuring means may be coupled to the spindle of the tool and determines the amplitude of vibration in accordance with the torque of the spindle.

The vibration measuring means may comprise an optical device such as, for example, a laser interferometer, or the like.

In order that the invention may be readily carried into effect, it will now be described with reference to the accompanying drawings, wherein.

Figure 3:
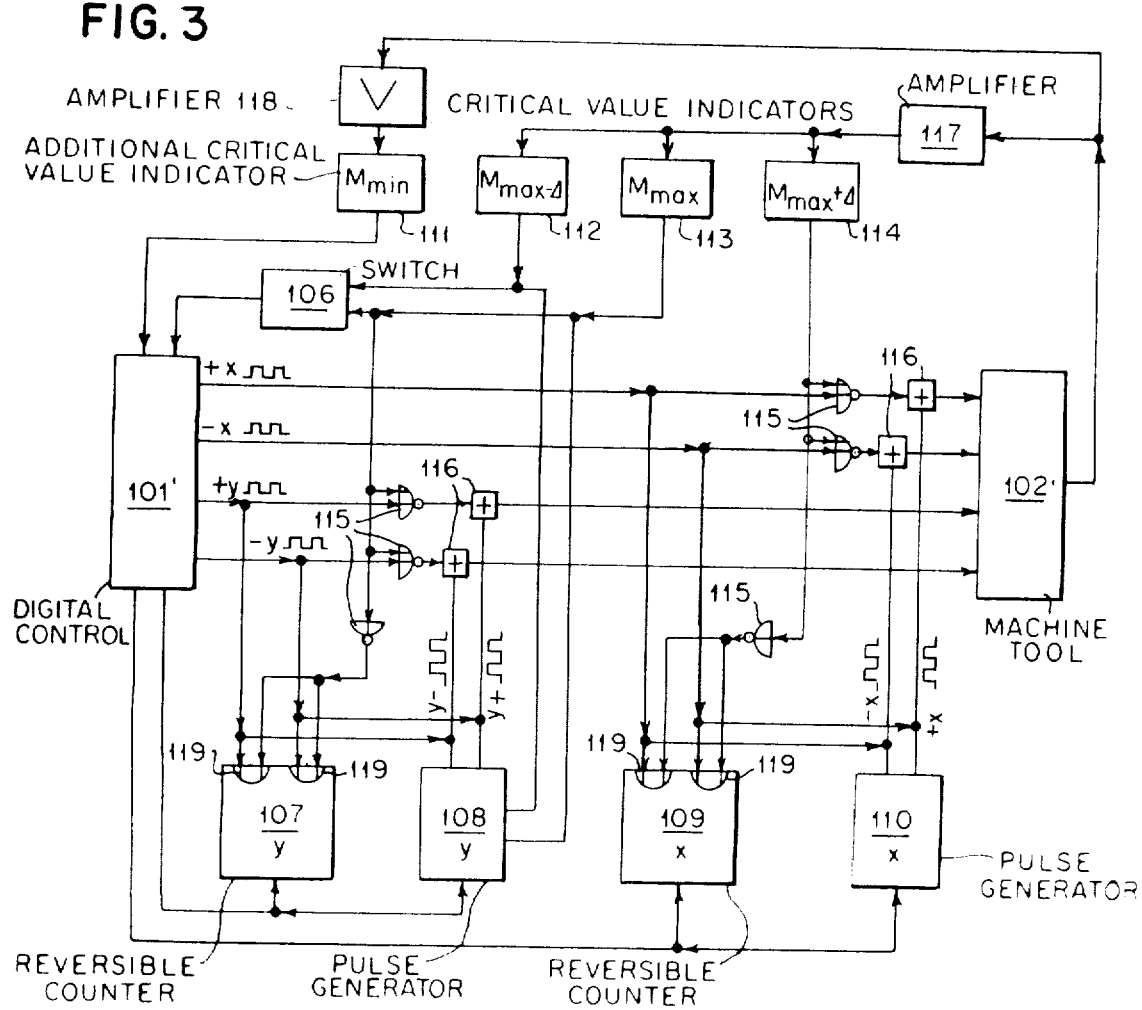

FIG. 3 is a schematic block diagram, in more detail, of the circuit arrangement of copending patent application Ser. No. 866,507, and now abandoned, for providing variable workpiece contours in accordance with the method illustrated in FIGS. 5a and 5b; and FIGS. 4a, 4b, 5a and 5b illustrate various methods of the copending patent application Ser. No. 866,507, and now abandoned, for providing variable workpiece contours.

In the FIGS., the same components are represented by the same reference numerals.

Figure 1:
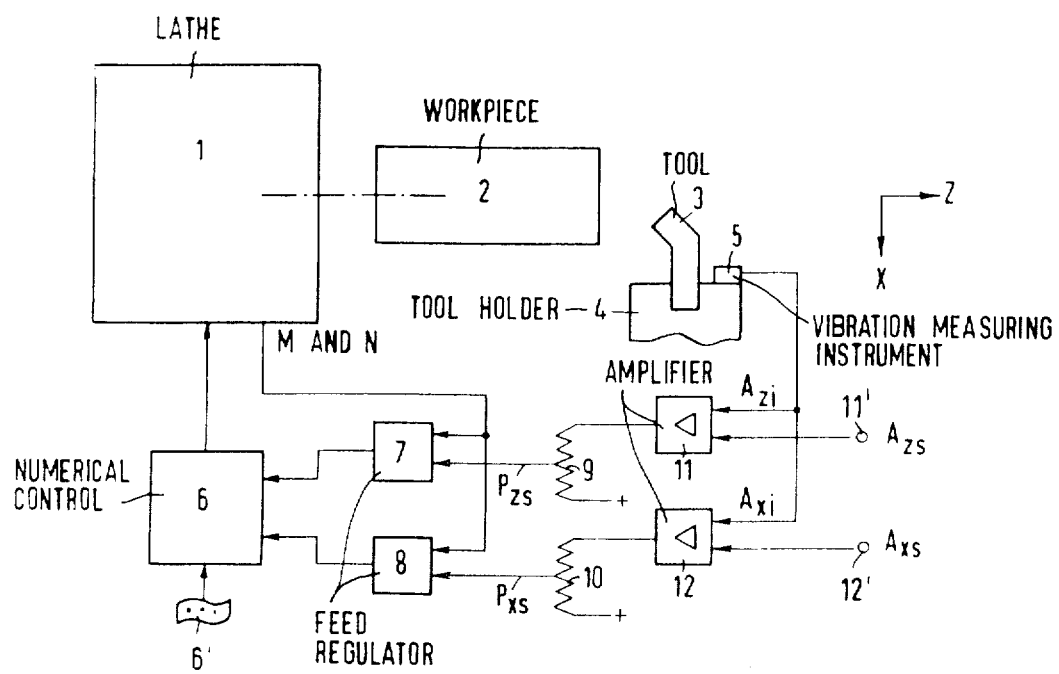
FIG. 1 is a schematic block diagram of the apparatus of the invention.

In FIG. 1, a workpiece 2 is adaptively processed by a turning tool 3 mounted on a turning machine 1 such as, for example, a lathe, milling machine, boring machine, or the like. The turning machine 1 is controlled by a numerical control 6 having an output connected to said turning machine. The numerical control 6 is controlled by a program recorded on a suitable record medium such as, for example, a perforated tape 6'.

The numerical control 6 adaptively determines the longitudinal work feed in the Z direction and the planar work feed in the X direction in accordance with the measured material or metal removing rate $P_r$. In order to provide the material removing rate $P_r$, signals representing the torque M and the speed n of the spindle of the machine 1 are supplied from said machine to feed regulators 7 and 8. In the feed regulators 7 and 8, the signals representing the torque M and the speed n of the spindle are multiplied by each other.

The actual magnitude of the material removing rate is compared with a datum or reference magnitude of the material removing rate $P_{zs}$ for the Z direction in the feed regulator 7. The comparison result of the actual and datum magnitudes of the material removing rate are supplied to the numerical control 6 from the feed regulator 7. The actual magnitude of the material removing rate is compared with a datum or reference magnitude of the material removing rate $P_{xs}$ for the X direction in the feed regulator 8. The comparison result of the datum magnitudes of the material removing rate are supplied to the numerical control 6 from the feed regulator 8. The comparison result provided by each of the feed regulators 7 and 8 constitutes a feed signal.

Sometimes, the datum or reference magnitudes of the material removing rates do not correspond to the maximum datum or reference magnitudes which are feasible for the machine output. Instead, the datum magnitudes of the material removing rates are limited due to vibrations of the machine. The vibrations of the tool 3 are measured by a vibration measuring instrument 5 mounted on a tool holder 4 of said tool. The vibration measuring instrument 5 supplies signals representing the amplitudes $A_{zi}$ of vibrations in the Z direction and signals representing the amplitudes $A_{xi}$ of vibrations in the X direction to amplifiers 11 and 12, respectively. A datum or reference magnitude $A_{zs}$ of vibration amplitude is supplied to another input of the amplifier 11 via an input terminal 11'. A datum or reference magnitude of vibration amplitude $A_{xs}$ is supplied to another input of the amplifier 12 via an input terminal 12'.

Each of the amplifiers 11 and 12 compares the actual measured vibration signals with the signals corresponding to datum magnitudes of vibrations and provides comparison results. Thus, the amplifier 11 compares the actual vibration signals $A_{zi}$ with the datum vibration signals $A_{zs}$. The amplifier 12 compares the actual vibration signals $A_{xi}$ with the datum vibration signals $A_{xs}$. The output of the amplifier 11 is coupled to an input of the feed regulator 7 via a potentiometer 9. The output of the amplifier 12 is coupled to an input of the feed regulator 8 via a potentiometer 10.

If the comparison result, as indicated by the output signal of each of the amplifiers 11 and 12 is zero, then the datum magnitudes supplied to the feed regulators 7 and 8 correspond to the maximum magnitudes adjusted at the potentiometers 9 and 10.

If the amplitudes of vibration increase, the amplifiers 11 and 12 produce comparison results and the voltages at the potentiometers 9 and 10 decrease. The datum or reference magnitudes $P_{zs}$ and $P_{xs}$ of the material removing rate $P_r$ are thus decreased.

The vibration measuring instrument 5 may comprise an acceleration measuring instrument. The vibration measuring instrument 5 may also comprise a device which determines the amplitude of vibration in accordance with the torque of the spindle. The vibration measuring instrument 5 may comprise an optical device such as, for example, a laser interferometer.

Figure 2:
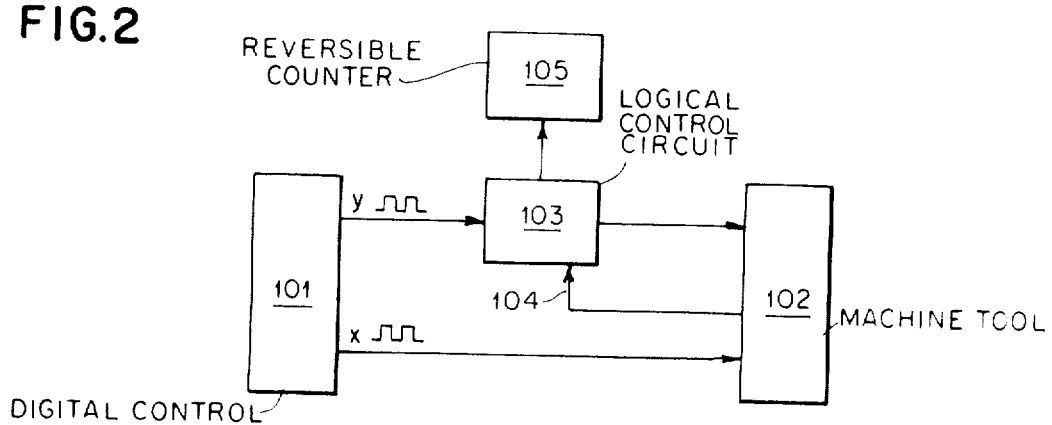
FIG. 2 is a schematic block diagram of the circuit arrangement of copending patent application Ser. No. 866,507, and now abandoned, for providing variable workpiece contours in accordance with the method illustrated in FIGS. 4a and 4b.

In FIG. 2, a digital control 101 produces control pulses $x$ and $y$ and supplies such control pulses to the $x$ and $y$ drives of machine tool 102. The x control pulses are supplied to the $x$ drive or stepping motor, for example, and the $y$ control pulses are supplied to the $y$ drive or stepping motor, for example. A logical control circuit 103 is connected into the $y$ control circuit which transfers the $y$ control pulses from the digital control 101 to the machine tool 102. An input of the logical control circuit 103 is connected to the digital control 101, an output of said logical control is connected to machine tool drives and an output of said logical control circuit is connected to the input of a reversible counter 105. The logical control circuit 103 has a second input connected to the machine tool 102 via a lead 104.

The logical control circuit 103 provides an increase or decrease in the cutting depth of the machine tool 102 in accordance with the torque applied thereto. The operation of the circuit arrangement or apparatus of FIG. 2 is described with reference to FIG. 4a. The contour $P_a$, $P_1$, $P_4$ and $P_e$ is programmed as a unit. This may be in a perforated strip, for example. Only $x$ control pulses are provided. No $y$ pulses are provided. The torque M applied to the cutting tool while it moves along the path $P_a$ to $P_1$ is less than the upper threshold level $M_{max}$ of the torque. There is thus no reason for reducing the cutting depth, that is, to move the cutting tool in the direction $+y$ (FIG. 4b).

If the reverse were true, and the torque M were less than the lower threshold level $M_{max} - \Delta$ of the torque, no increase would be provided in the cutting depth, since the contour produced by the cutting tool would then coincide with the programmed contour. The contour is monitored by the zero position of the reversible counter 105.

When the tool reaches the point $P_1$, the torque M applied thereto exceeds the upper threshold level $M_{max}$. This signals the logical control circuit 103 to supply $+y$ control pulses to the machine tool to reduce the cutting depth. The $+y$ control pulses, which comprise a $y$ deviation from the programmed contour, are simultaneously supplied to the reversible counter 105. If the forward feed speeds in the $x$ and $y$ directions are equal to each other, the cutting tool moves at an angle of 45° to the point $P_2$, as shown by the broken dot and dash line.

At the point $P_2$ the cutting tool begins to move freely and the upper threshold level $M_{max}$ is thereby fallen short of. As a result, the reduction in the cutting depth $+y$ is blocked or halted and the tool moves along the contour path $P_2$ to $P_3$. The tool again moves freely and the torque decreases to a magnitude which is less than the lower threshold level $M_{max} - \Delta$. This indicates that the cutting depth will increase. The increase in the cutting depth is permissible, however, since the programmed y contour deviates from the actual contour, as indicated by the count condition of the reversible counter 105.

The logical control circuit 103 (FIG. 2) then supplies $-y$ pulses to the machine tool 102 and to the reversible counter 105. The tool 102 (FIG. 2) then moves from the point $P_3$ to the point $P_4$ along the contour path $P_3$ to $P_4$. At the point $P_4$, the count condition of the reversible counter 105 is zero. This indicates that the cutting depth y must not be further increased. The logical control circuit 103 thus does not provide any more pulses. The machine tool then moves along the contour path $P_4$ to $P_e$ from the point $P_4$ to the point $P_e$. The cycle is then repeated, from the point $P_a$ to the point $P_e$, as described, until the machine tool moves over the entire contour at rapid speed. When the machine tool moves over the entire contour path at rapid speed, the actual contour coincides with the programmed contour, and such contour is indicated by the linear broken line $P_a$ $P_1$ $P_4$ $P_e$. The method described for providing the broken contour of FIG. 4a may be utilized to provide the depressions, channel, groove, and the like, of FIG. 4b. In FIG. 4b, the dot and dash line indicates the contour path of the machine tool in one cycle of operation. The desired contour is indicated by the broken line.

FIG. 3 illustrates apparatus or a circuit arrangement for performing the method illustrated in FIG. 5a. In FIG. 3, as in FIG. 2, a digital control 101' produces $+x$, $-x$, $+y$ and $-y$ control pulses and supplies said pulses to a machine tool 102'. A plurality of critical value indicators is provided. The critical value indicator 112 has a variable response sensitivity to the lower threshold level $M_{max}-\Delta$. The critical indicator 113 has a variable response sensitivity to the upper threshold level $M_{max}$. The critical indicator 114 has a variable response sensitivity to a threshold level $M_{max}+\Delta$ above the upper threshold level. The machine tool 102' is connected to the input of each of the critical value indicators 112, 113, and 114 via an amplifier and smoothing circuit or filter 117. The part of the machine tool 102' which is connected to the amplifier 117 is the measurand transmitter thereof, which may comprise, for example, the torque transmitter.

The outputs of the critical value indicators 112, 113 and 114 are connected to an input of the digital control 101' via a switch 106. The measurand transmitter of the machine tool 102' is connected to another input of the digital control 101' via an amplifier 118 and an additional critical value indicator 111, connected in series circuit arrangement therewith, which is a variable response sensitivity to a minimum threshold level $M_{min}$ of the torque. The output signals of the critical value indicators 112, 113 and 114 control the type or mode of operation or process, as well as the blocking or release of the power reversible counters 107 and 109 and a pair of pulse generators 108 and 110.

The reversible counter 107 is for the $y$ direction, the reversible counter 109 is for the $x$ direction. The pulse generator 108 is for the $y$ direction and the pulse generator 110 is for the $x$ direction. The control of the pulse generators 108 and 110 by the digital control 101' is effected via NOR stages or gates 115 and adders or adding components 116, which lock the additional control pulses into the corresponding pulse generators 108 and 110. The digital control 101' controls the reversible counters 107 and 109 via NOR gates 119. The additional critical value indicator 111 controls the changeover from rapid to working speed of the tool.

In FIG. 5a, the desired contour path is indicated as $P_0$, $P'_1$, $P'_4$ and $P_5$. The feed or movement of the machine tool is from $x_0$ to $x_5$. The digital control 101' (FIG. 3) thus supplies to the machine tool 102' a number of $x$ pulses corresponding to the distance $x_0$ to $x_5$.

If the milling or cutting tool F of FIG. 5a is not at the point $P_0$ at the commencement of the milling process or operation, said milling tool initially moves at rapid speed toward the workpiece W. The torque M applied to the cutting tool F remains less than the minimum torque or threshold level $M_{min}$. At the point $P_0$, the tool F engages the workpiece W. The torque applied by the torque transmitter to the machine tool 102' then exceeds the minimum threshold level $M_{min}$. This causes the additional critical value indicator 111 (FIG. 3) to initiate the work feed. When the torque increases so that it is greater than the lower threshold level $M_{max}-\Delta$ and less than the upper threshold level $M_{max}$, the working process proceeds rapidly. If the torque were to increase to a magnitude greater than the upper threshold level $M_{max}$, the work process would proceed slowly and the cutting depth would be reduced.

If the cutting tool F is positioned along the contour path $P_0$ to $P'_1$ and the torque applied to said tool is between the lower threshold level and the upper threshold level, said contour path is milled at rapid speed. When the milling tool F abuts the projection at the point $P'_1$, the upper threshold level $M_{max}$ of the torque is exceeded. The work process then continues slowly, rather than rapidly, and a command is simultaneously provided to reduce the cutting depth in the direction $+y$ (FIG. 5b). The pulse generator 108 of FIG. 3 is controlled by the critical value indicator 113 for this purpose. The pulse generator 108 supplies $+y$ control pulses to the machine tool 102' via the corresponding adder 116.

The $+y$ control pulses supplied by the pulse generator 108 to the machine tool 102' are also supplied to the reversible counter 107. Since this corresponds to a substantially vertical contour path, the threshold level $M_{max}+\Delta$ above the upper threshold level is exceeded a short time thereafter. This causes the critical value indicator 114 to respond and block the $x$ forward feed. The critical value indicator 114 controls the pulse generator 110 to supply $+x$ pulses to the reversible counter 109 and to the machine tool 102' via the corresponding adder 116. The milling tool F then moves from the point $P'_1$ to the point $P'_2$ (FIG. 5a).

The torque applied to the tool F becomes less than the threshold level $M_{max}+\Delta$ when said tool is in the vicinity of the point $P'_2$. As a result, the $x$ control pulses are supplied to the machine tool F. The torque decreases to less than the upper threshold level $M_{max}$ due to the reduction of the cutting depth. The reduction of the cutting depth is halted at the point $P'_2$ in the direction $+y$. The contour path $P'_1$ to $P'_2$ is then recorded or stored in the reversible counter 107. The contour path which the tool 102' or F would have moved in the $x$ direction, if the $x$ forward feed were not blocked, is stored or recorded in the counter 109.

The cutting tool F is moved from the point $P'_2$ to the point $P'_3$ along the contour path $P'_2$ to $P'_3$ in FIG. 5a. At the point $P'_3$, the cutting tool moves freely, so that the torque applied thereto becomes less than the minimum threshold level $M_{max}-\Delta$. A command signal is then supplied to the pulse generator 108 and said pulse generator, in response to said command signal, supplies six control pulses for increasing the cutting depth. The $y$ control pulses are simultaneously supplied to the reversible counter 107 and said counter then counts backward. When the machine tool reaches the point $P'_4$ at the end of the contour path $P'_3$ to $P'_4$, the count condition of the reversible counter 107 is zero. The pulse generator 108 is then halted in operation and the cutting tool 102' (FIG. 3) is moved in $x$ direction, along the contour path $P'_4$ to $P_5$, from the point $P'_4$ to the point $P_5$.

Only the $x$ direction control pulses supplied to the reversible counter 109 during the blocking condition are unaccounted for. To account for these pulses, the repetition of the operation or process cycle should be blocked or delayed until the count condition of the reversible counter 109 reaches zero. At the end of each cycle of operation a command is transferred to the pulse generator 110 (FIG. 3), in the aforedescribed manner, so that said pulse generator supplies control pulses simultaneously to the counter 109 of the machine tool 102', until said counter again reaches its zero count condition. The cycle, as described, is then repeated until the entire contour path $P_0$ $P'_1$ $P'_4$ $P_5$ is traversed by the tool at rapid speed. At such time, the desired contour path, indicated by the broken lines, is actually attained.

The aforedescribed operation may be utilized to provide the contour shown in FIG. 5b.

Each of the component blocks of each of FIGS. 2 and 3 represents a known circuit arrangement and any suitable circuit which functions in the manner indicated may be utilized as such block.

While the invention has been described by means of a specific example and in a specific embodiment, we do not wish to be limited thereto, for obvious modifications will occur to those skilled in the art without departing from the spirit and scope of the invention.

We claim:

1. A method for adaptive control of a turning machine tool for removal of material from a workpiece, including the steps of rapidly feeding the tool until it comes into contact with a workpiece, work feeding the tool up to a maximum to the programmed contour after a magnitude depending upon the material removing rate exceeds a lower threshold level, reducing the work feeding and movement of the tool in the direction of reduced feed-in for a period of time when the magnitude depending upon the removing rate exceeds an upper threshold level, work feeding the tool repeatedly until the actual contour of the workpiece coincides with a programmed contour, deriving the material removing rate $P_z$ from the speed and torque of the tool or workpiece, controlling the feed velocity $V_z$ in one direction of movement of the tool or workpiece in dependence upon the material removing rate and controlling the feed velocity $V_r$ in a direction perpendicular to the one direction in dependence upon the feed velocity $V_z$, said method comprising the steps of

- measuring vibrations of the tool or workpiece during operation to produce vibration signals corresponding to actual vibrations in mutually perpendicular directions;
- comparing the vibration signals with signals corresponding to datum magnitudes of vibrations in said directions to provide comparison results; and
- correcting the work feeding of the tool or workpiece in accordance with the comparison results.

2. A method as claimed in claim 1, further comprising comparing the material removing rate derived from the speed and torque of the tool or workpiece with signals corresponding to datum magnitudes of the material removing rate in said directions to provide rate comparison results, and correcting the datum magnitude of the material removing rate in at least one of the directions in accordance with the rate comparison results.

3. Apparatus for adaptive control of a turning machine tool for removal of material from a workpiece, including a tool holder for said tool, feeding means for rapidly feeding the tool until it comes into contact with a workpiece, and work feeding means for work feeding the tool up to a maximum to the programmed contour after a magnitude depending upon the forming power and the material removing rate exceeds a lower threshold level and for reducing the work feeding and movement of the tool in the direction of reduced feed-in for a period of time until the magnitude depending upon the forming power exceeds an upper threshold level, said work feeding means operating repeatedly until the actual contour of the workpiece coincides with a programmed contour, said work feeding means being connected to said tool or workpiece for receiving signals representing the speed and torque of the tool or workpiece and producing a first control signal for controlling the feed velocity $V_z$ in one direction of movement of the tool or workpiece in dependence upon the material removing rate and producing a second control signal for controlling a feed velocity $V_r$ in a direction perpendicular to the one direction in dependence upon the feed velocity $V_z$ and the first derivative $dP_z/dt$ of the material removing rate $P_z$, said apparatus comprising

- vibration measuring means mounted on said tool holder for measuring vibrations of the tool during operation to produce vibration signals corresponding to actual vibrations in mutually perpendicular directions;
- comparing means connected to said vibration measuring means for comparing the vibration signals with signals corresponding to datum magnitudes of vibration in said directions to provide comparison results; and
- feed regulating means for controlling said tool coupled between said comparing means and said tool for controlling the work feeding of said tool in accordance with the comparison results.

4. Apparatus as claimed in claim 3, wherein said tool has a spindle and said vibration measuring means is coupled to the spindle of the tool and determines the amplitude of vibration in accordance with the torque of said spindle.

5. Apparatus as claimed in claim 3, wherein said vibration measuring means comprises an optical device.

* * * * *